US011861370B2

(12) United States Patent
Izzi et al.

(10) Patent No.: US 11,861,370 B2
(45) Date of Patent: Jan. 2, 2024

(54) AUTOMOTIVE BOOT OPTIMIZATION BY UTILIZING MULTIPLE PHASES OF BOOT-UP PROCEDURES

(71) Applicant: Micron Technology, Inc., Boise, ID (US)

(72) Inventors: Roberto Izzi, Caserta (IT); Luca Porzio, Casalnuovo (IT); Dionisio Minopoli, Frattamaggiore (IT)

(73) Assignee: Micron Technology, Inc., Boise, ID (US)

( * ) Notice: Subject to any disclaimer, the term of this patent is extended or adjusted under 35 U.S.C. 154(b) by 139 days.

(21) Appl. No.: 17/646,254

(22) Filed: Dec. 28, 2021

(65) Prior Publication Data

US 2023/0069752 A1    Mar. 2, 2023

Related U.S. Application Data

(60) Provisional application No. 63/238,006, filed on Aug. 27, 2021.

(51) Int. Cl.
*G06F 9/00* (2006.01)
*G06F 9/4401* (2018.01)
*G06F 3/06* (2006.01)

(52) U.S. Cl.
CPC .......... *G06F 9/4406* (2013.01); *G06F 3/0604* (2013.01); *G06F 3/0659* (2013.01); *G06F 3/0679* (2013.01)

(58) Field of Classification Search
CPC .... G06F 9/4406; G06F 3/0604; G06F 3/0659; G06F 3/0679; G06F 9/00
See application file for complete search history.

(56) References Cited

U.S. PATENT DOCUMENTS

| | | | |
|---|---|---|---|
| 11,275,591 B2* | 3/2022 | Chen | G06F 11/1417 |
| 11,550,592 B2* | 1/2023 | Kotary | G06F 9/4401 |
| 2010/0169558 A1* | 7/2010 | Honda | G06F 9/4403 |
| | | | 711/E12.001 |
| 2014/0281458 A1* | 9/2014 | Ravimohan | G06F 9/4401 |
| | | | 713/2 |
| 2021/0182075 A1* | 6/2021 | Jain | G06N 20/00 |

\* cited by examiner

*Primary Examiner* — Tammara R Peyton
(74) *Attorney, Agent, or Firm* — Holland & Hart LLP

(57) ABSTRACT

Methods, systems, and devices for automotive boot optimization are described. For instance, a memory system may record addresses that are accessed as part of multiple phases of a first boot-up procedure. During a second boot-up procedure, the memory system may transfer, from a logical block address of a non-volatile memory device to a volatile memory device, information for a respective phase based on the recording of the phases of the first boot-up procedure. The memory system may receive a command to transmit the information to a host system as part of the respective phase after transferring the information from the non-volatile device to the volatile memory device.

25 Claims, 6 Drawing Sheets

AUTOMOTIVE BOOT OPTIMIZATION BY UTILIZING MULTIPLE PHASES OF BOOT-UP PROCEDURES

CROSS REFERENCE

The present application for patent claims the benefit of U.S. Provisional Patent Application No. 63/238,006 by IZZI et al., entitled "AUTOMOTIVE BOOT OPTIMIZATION," filed Aug. 27, 2021, assigned to the assignee hereof, and expressly incorporated by reference herein.

FIELD OF TECHNOLOGY

The following relates generally to one or more systems for memory and more specifically to automotive boot optimization.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not- or (NOR) and not- and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

A vehicle may include systems that employ memory devices, such as a NOT-AND (NAND) device, that aid in one or more services performed by the systems. However, in some examples, a delay between the vehicle powering on the systems (e.g., due to the vehicle being started) and other systems of vehicle coming online (e.g., safety systems, which may include a back-up camera or parking camera) may occur due at least in part to latency from the NAND device during a boot-up procedure. Accordingly, reducing the duration of the boot-up procedure (e.g., by reducing latency associated with the NAND device) may reduce latency from powering the system to the other systems being online.

Techniques are described herein that reduce the duration. For instance, a boot-up procedure may be characterized by multiple phases (e.g., a universal flash storage (UFS) boot recording phase, a kernel loading phase, and a kernel start phase), where each phase of the boot-up procedure may be preceded by a hardware reset of one or more components of the system. The system may record the commands associated with each phase of the boot-up procedure as well as one or more logical block addresses (LBAs) associated with information retrieved during the boot-up procedure. In subsequent boot-up procedures, the system may use the recorded commands and the recorded LBAs to transfer information from a non-volatile memory device (e.g., a NAND device) to a volatile memory device (e.g., a cache of the memory system) before the associated commands are received by the memory system. The requested information may be retrieved from the volatile memory device more quickly than from the non-volatile memory device. Accordingly, upon receiving the commands, the memory system may more quickly provide the associated information to the host system. Thus, the duration of boot-up may be reduced.

Features of the disclosure are initially described in the context of systems as described with reference to FIGS. 1-2. Features of the disclosure are described in the context of process flows with reference to FIGS. 3-4. These and other features of the disclosure are further illustrated by and described in the context of an apparatus diagram and a flowchart that relate to automotive boot optimization with reference to FIGS. 5-6.

Figure 1:
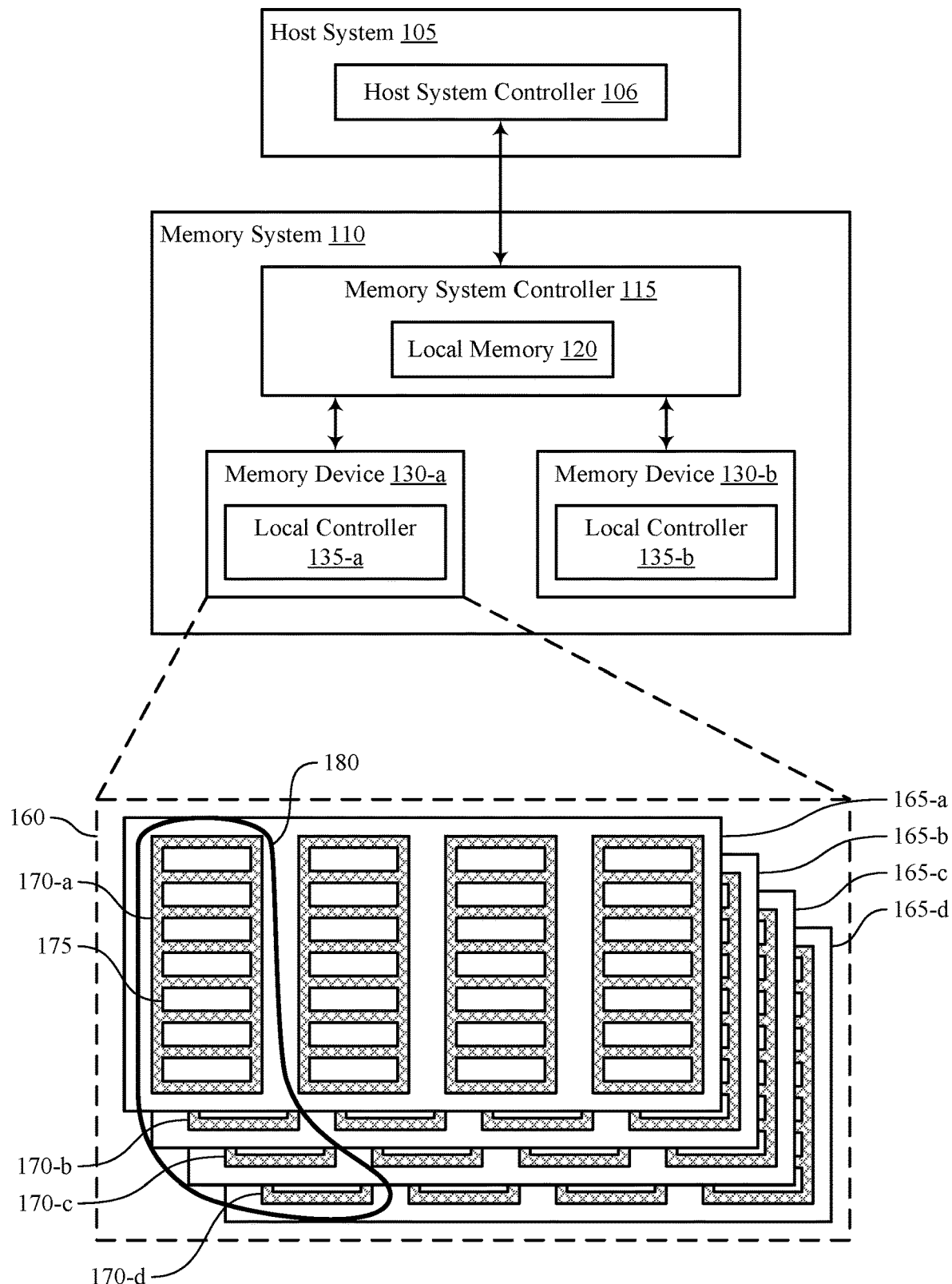
FIG. 1 illustrates an example of a system that supports automotive boot optimization in accordance with examples as disclosed herein.

FIG. 1 illustrates an example of a system 100 that supports automotive boot optimization in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165 c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support automotive boot optimization. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some examples, a vehicle may include the system 100. In some such examples, a delay between the vehicle powering on the system 100 (e.g., due to the vehicle being started) and other systems of vehicle coming online (e.g., safety systems, which may include a back-up camera or parking camera) may occur due at least in part to latency from the memory system 110 and/or memory devices 130-a and 130-b during a boot-up procedure. Accordingly, reducing the duration of the boot-up procedure (e.g., by reducing latency associated with the memory system 110 and/or memory devices 130-a and 130-b) may reduce latency from powering the system to the other systems being online.

Techniques are described herein that reduce the duration. For instance, a boot-up procedure may be characterized by multiple phases (e.g., a UFS boot recording phase, a kernel loading phase, and a kernel start phase), where each phase of the boot-up procedure may be preceded by a hardware reset of one or more components of the memory system 110. The memory system 110 may record the commands associated with each phase of the boot-up procedure as well as one or more LBAs associated with information retrieved during the boot-up procedure. In subsequent boot-up procedures, the memory system 110 may use the recorded commands and the recorded LBAs to transfer information from a non-volatile memory device (e.g., a NAND device, such as memory device 130-a or memory device 130-b) to a volatile memory device (e.g., a cache of the memory system 110) before the associated commands are received by the memory system 110. The requested information may be retrieved from the volatile memory device more quickly than from the non-volatile memory device. Accordingly, upon receiving the commands, the memory system 110 may more quickly retrieve the associated information. Thus, the duration of boot-up may be reduced.

Figure 2:
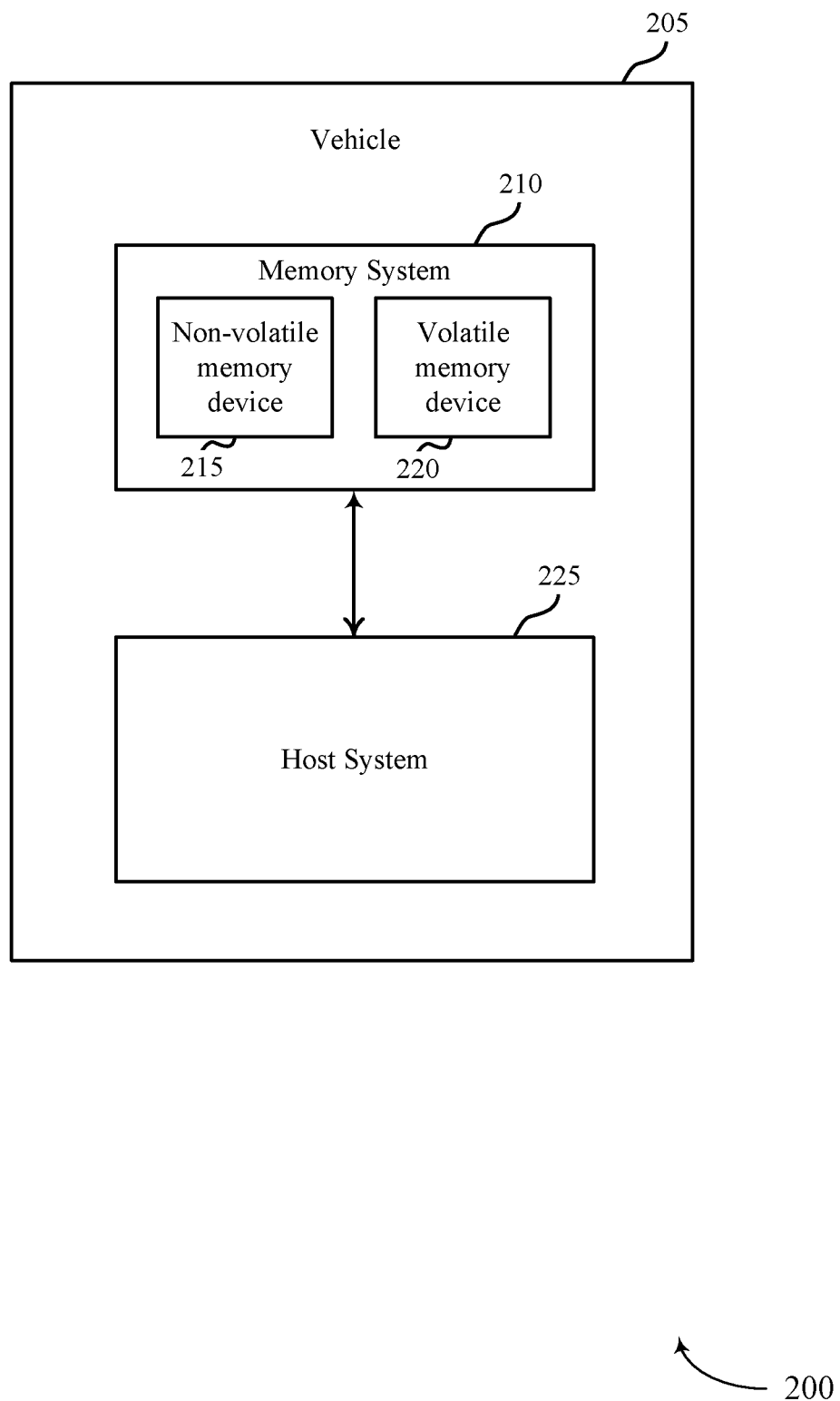
FIG. 2 illustrates an example of a system that supports automotive boot optimization in accordance with examples as disclosed herein.

FIG. 2 illustrates an example of a system 200 that supports automotive boot optimization in accordance with examples as disclosed herein. The system 200 may be an example of a system 100 as described with reference to FIG. 1 or aspects thereof.

Vehicle 205 may include a memory system 210 and a host system 225. In some examples, memory system 210 may be an example of a memory system 110 as described with reference to FIG. 1 and host system 225 may be an example of a host system 105 as described with reference to FIG. 1. In some examples, the memory system 210 may include a non-volatile memory device 215 (e.g., a NAND) and a volatile memory device 220 (e.g., a cache). In some examples, one or both of non-volatile memory device 215 and volatile memory device 220 may be an example of a memory device 130-a or 130-b as described with reference to FIG. 1.

The vehicle 205 may be a device capable of performing locomotion, carrying, transporting, or any combination thereof. Examples of the vehicle 205 may include a motor vehicle (e.g., a car, a truck, a train, a motorcycle), an aircraft (e.g., a plane, a helicopter), a boat, or a human-powered transport (e.g., a bicycle). In some examples, the vehicle 205 may include systems that employ the use of the memory system 210 and/or the host system 225. For instance, the vehicle may include a parking camera or a back-up camera that stores information at or retrieves information from the memory system 210.

The memory system 210 may be or include any device or collection of devices, where the device or collection of devices includes at least one memory array. For example, a memory system 210 may be or include a UFS device, an eMMC device, a flash device, a USB flash device, an SD card, an SSD, an HDD, a DIMM, a SO-DIMM, or an NVDIMM, among other possibilities. The non-volatile memory device 215 may be a device that includes one or more memory arrays of non-volatile memory cells (e.g., a NAND memory device) and the volatile memory device 220 may be a devices that includes one or more memory arrays of volatile memory cells (e.g., a cache).

In some examples, the host system 225 and/or the memory system 210 may operate according to an operating system (OS). One such OS may include QNX OS, which may be a microkernel-based OS executed in the form of multiple tasks referred to as resource managers. One example of a resource manager for the vehicle 205 may be a parking camera or a back-up camera.

Generally, the methods described herein may enable boot-up time to be reduced by recording commands and LBAs (e.g., and/or transfer lengths) used in a prior boot-up procedure to retrieve information from the non-volatile memory device 215 and using the recorded LBAs for subsequent boot-up procedures in order to store the information in the volatile memory device 220 before an associated command is received. For instance, a boot-up procedure may be characterized by multiple phases (e.g., a UFS boot recording phase, a kernel loading phase, and a kernel start phase), where each phase of the boot-up procedure may be preceded by a hardware reset of one or more components of the memory system 110. The memory system 110 may record the commands associated with each phase of the boot-up procedure as well as at least one logical block address (LBA) associated with information retrieved during the boot-up procedure. In subsequent boot-up procedures, the memory system 110 may use the recorded commands and the recorded LBAs to transfer information from a non-volatile memory device (e.g., a NAND device, such as memory device 130-a or memory device 130-b) to a volatile memory device (e.g., a cache) before the associated commands are received by the memory system 110. The requested information may be retrieved from the volatile memory device 220 more quickly than from the non-volatile memory device 215. Accordingly, upon receiving the commands, the memory system 110 may more quickly retrieve the associated information. Thus, the duration of boot-up may be reduced. Additional details may be described herein, for instance, with reference to FIG. 3.

Additionally, the methods described herein may enable the memory system 210 to detect if changes occur to the boot-up procedure after the initial recording (e.g., due to a system update). For instance, if the memory system 210 detects that above a threshold number of LBAs are associated with information not stored at the volatile memory device 220 (e.g., due to the LBAs not being recorded during a prior boot-up procedure), the memory system 210 may rerecord the commands and LBAs of the phase. Additional details may be described herein, for instance, with reference to FIG. 4. For example, if the memory system 210 experiences a quantity of cache 'misses' that satisfy a threshold in response to replaying the recorded boot-up procedure, the memory system 210 may re-record at least portion of the boot-up procedure.

The described methods may be implemented in an embedded environment (e.g., a UFS or eMMC). Once a first boot-up is completed, the recorded trace (e.g., recorded LBAs and/or commands) may be used to improve and/or decrease boot time. In order to decrease the latency of each command and improve boot time, a memory system 210 may pre-load LBAs in the volatile memory device 220 and may group NAND pages together during garbage collection execution (e.g., as the memory system 210 may identify the LBAs to be in sequence during the first boot-up time).

Figure 3:
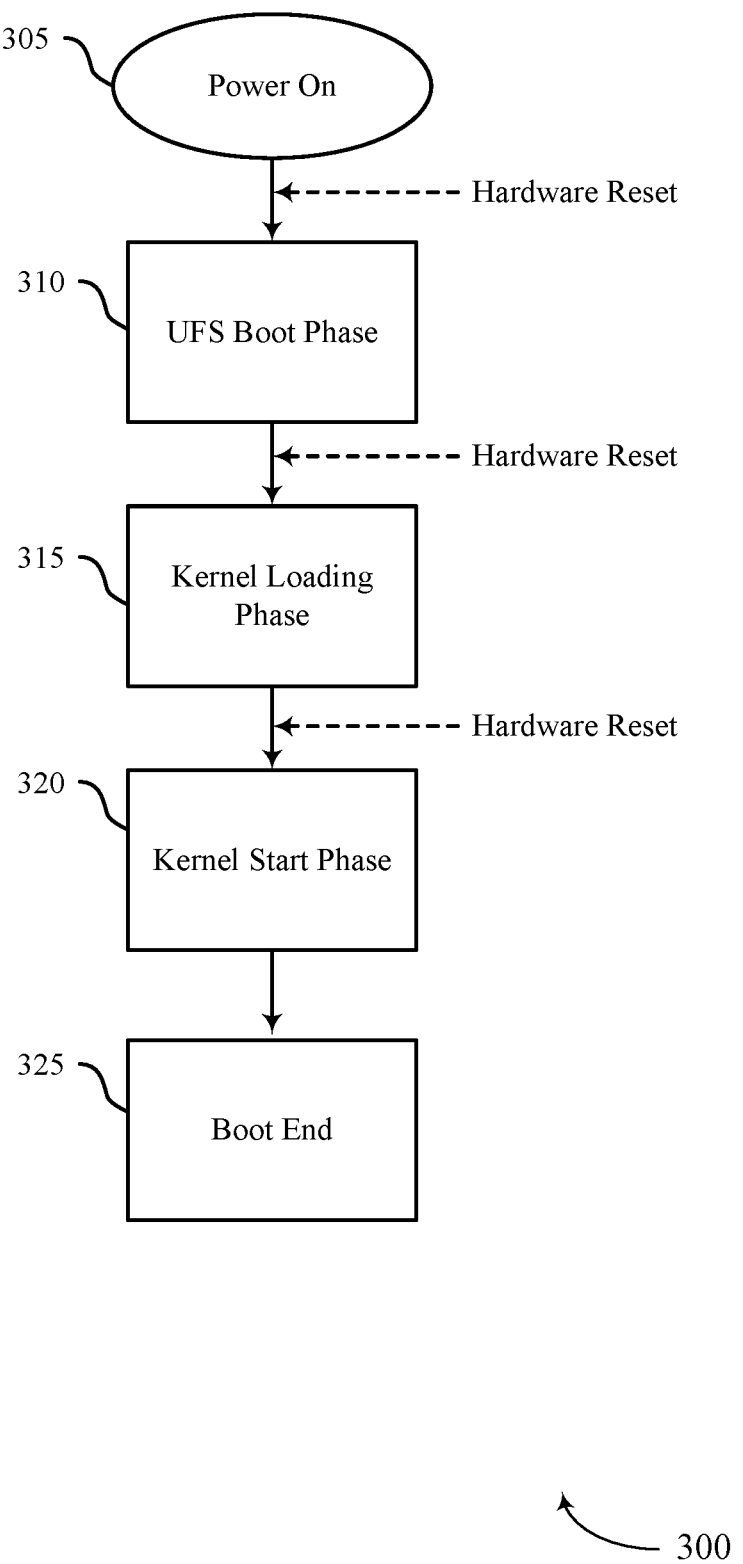
FIG. 3 illustrates an example of a process flow that supports automotive boot optimization in accordance with examples as disclosed herein.

FIG. 3 illustrates an example of a process flow 300 that supports automotive boot optimization in accordance with examples as disclosed herein. In some examples, process flow 300 may be implemented by one or more aspects of systems 100 and/or 200. For instance, process flow 300 may be implemented by a memory system 110 as described with reference to FIG. 1 and/or a memory system 210 as described with reference to FIG. 2. In some examples, process flow 300 may correspond to a self-learning phase. Aspects of the process flow 300 may be implemented by a controller, among other components. Additionally or alternatively, aspects of the process flow 300 may be implemented as instructions stored in memory (e.g., firmware stored in a memory coupled with a controller). For example, the instructions, in response to being executed by a controller (e.g., the memory system controller 115), may cause the controller to perform the operations of the process flow 300.

At 305, power on for a host system may occur. For instance, a host system and an associated memory system may power on. Powering on may include coupling one or more components of the memory system with one or more sources. Between 305 and 310, the memory system may undergo a hardware reset, in which the one or more components are isolated from the one or more sources and, subsequently, recoupled with the one or more sources.

At 310, a UFS boot phase of a boot-up procedure may be performed. For instance, the memory system may perform a UFS boot phase (e.g., a first phase). The memory system may determine that the UFS boot phase is occurring based on one or more signatures (e.g., the one or more signatures may indicate that the UFS boot procedure is occurring). For instance, a voltage may transition from a first value to a second value (e.g., $V_{CC}$ and/or $V_{CCQ}$ may transition from 0 to a high state). Additionally or alternatively, a speed mode may be set to a particular mode (e.g., an HS-G1B mode). In response to identifying that the UFS boot phase is occurring, the memory system may record one or more commands received during the UFS boot phase and/or one or more LBAs from which information is retrieved during the UFS boot phase. Between 310 and 315, the memory system may undergo a hardware reset.

At 315, a kernel loading phase of a boot-up procedure may be performed. For instance, the memory system may perform a kernel loading phase (e.g., a second phase). The memory system may determine that the kernel loading phase is occurring based on one or more signatures (e.g., the one or more signatures may indicate that the kernel loading procedure is occurring). For instance, the memory system may determine that the kernel loading phase is occurring based on the hardware reset occurring between 310 and 315 (e.g., the hardware reset may indicate that the kernel loading procedure is occurring). Additionally or alternatively, the memory system may poll a particular flag (e.g., an fDeviceInit flag), may set the speed mode to a particular mode (e.g., an HS-G3B x1 mode), or any combination thereof. During the kernel loading phase, the memory system may load a boot image, which may be a range of LBAs retrieved during a read operation. Additionally or alternatively, the memory system may read but may not write during the kernel loading phase. In response to identifying that the kernel loading phase is occurring, the memory system may record one or more commands received during the kernel loading phase and/or one or more LBAs from which information is retrieved during the kernel loading phase. Between 315 and 320, the memory system may undergo a hardware reset.

At 320, a kernel start phase of a boot-up procedure may be performed. For instance, the memory system may perform a kernel start phase (e.g., a third phase). The memory system may determine that the kernel start phase is occurring based on one or more signatures (e.g., the one or more signatures may indicate that the kernel start phase is occurring). For instance, the memory system may determine that the kernel start phase is occurring based on the hardware reset occurring between 315 and 320 (e.g., the hardware reset may indicate that the kernel start phase is occurring). Additionally or alternatively, the memory system may poll a particular flag (e.g., an fDeviceInit flag), may bring the UFS protocol into a particular mode (e.g., an HS-G3B x2 mode and/or an HS-G4A x2 mode), may issue both read and write commands, or any combination thereof. During the kernel start phase, the memory system may issue write commands and read commands issued at specific LBAs. In response to identifying that the kernel start phase is occurring, the memory system may record one or more commands received during the kernel start phase and/or one or more LBAs from which information is retrieved during the kernel start phase. At 325, the memory system may end boot-up.

Figure 4:
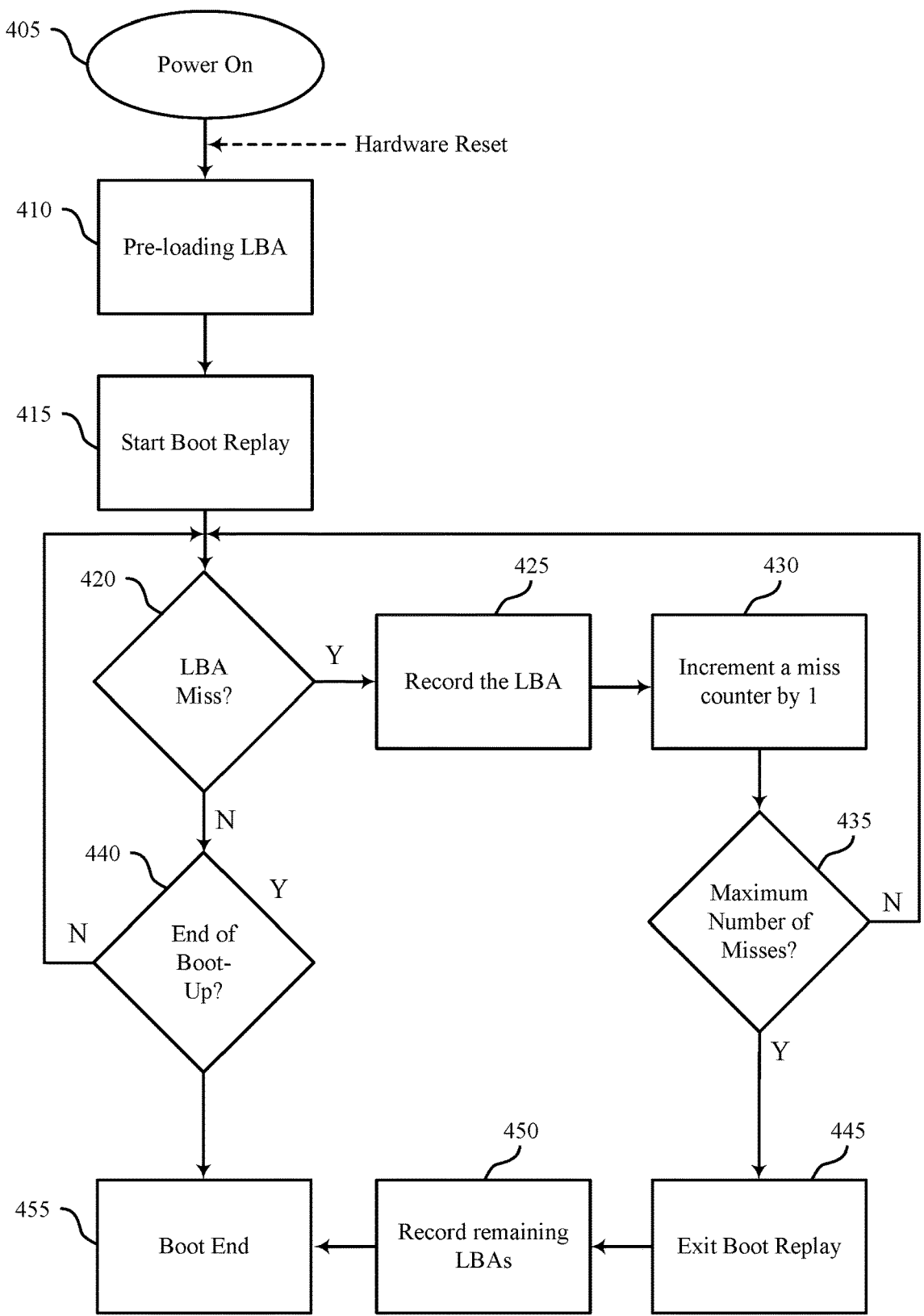
FIG. 4 illustrates an example of a process flow that supports automotive boot optimization in accordance with examples as disclosed herein.

FIG. 4 illustrates an example of a process flow 400 that supports automotive boot optimization in accordance with examples as disclosed herein. In some examples, process flow 400 may be implemented by one or more aspects of systems 100 and/or 200. For instance, process flow 400 may be implemented by a memory system 110 as described with reference to FIG. 1 and/or a memory system 210 as described with reference to FIG. 2. In some examples, process flow 400 may correspond to a replay phase. Aspects of the process flow 400 may be implemented by a controller, among other components. Additionally or alternatively, aspects of the process flow 400 may be implemented as instructions stored in memory (e.g., firmware stored in a memory coupled with a controller). For example, the instructions, in response to being executed by a controller (e.g., the memory system controller 115), may cause the controller to perform the operations of the process flow 400.

In response to a boot-up procedure (or one or more phases of a boot-up procedure) being recorded, the recording may be used to improve the latency for performing a boot-up procedure. For example, in subsequent boot-up procedures (after the boot-up procedure used to record), a memory system may use the recording to pre-load information in some LBAs in a cache of the memory system. Pre-loading information into a cache (from a NAND device) may increase the likelihood that a cache hit occurs. Retrieving information from a cache after receiving a command may take less time than retrieving information from a NAND device after receiving the command. Thus, pre-loading information into a cache based on a recording may reduce the total time it takes to perform a boot-up procedure.

At 405, power on may occur. For instance, the memory system may power on. Powering on may include coupling one or more components of the memory system with one or more sources. Between 405 and 410, the memory system may undergo a hardware reset, in which the one or more components are isolated from the one or more sources and, subsequently, recoupled with the one or more sources.

At 410, the LBAs recorded for a prior boot-up may be pre-loaded. For instance, the memory system may pre-load the LBAs recorded as part of a prior boot-up (e.g., as described with reference to FIG. 3). For instance, the memory system may transfer information associated with the LBAs from a non-volatile memory device (e.g., NAND) to a volatile memory device (e.g., a cache).

At 415, boot-replay may begin. For instance, the memory system may begin boot replay. During boot replay, after the memory system receives a command (e.g., from a host system) to retrieve information from one of the LBAs, the memory system may retrieve the information corresponding to the LBA from the volatile memory system and may transmit the information (e.g., to the host system).

At 420, whether or not information associated with an LBA is retrievable from a volatile memory device of the memory system may be determined (e.g., did the memory system experience a 'cache hit' or a 'cache miss'). For instance, the memory system may determine whether or not information associated with an LBA (e.g., indicated by a received command) is retrievable from a volatile memory device of the memory system (e.g., a cache hit). If the information is not retrievable (e.g., the information was not transferred from the non-volatile memory device to the volatile memory device at 410), the memory system may proceed to 425 (e.g., a cache miss). However, if the information is retrievable (e.g., the information was transferred from the non-volatile memory device to the volatile memory device at 410), the memory system may transmit the requested information to the host system and may proceed to 440.

At 440, whether the memory system has reached end of boot-up may be determined. For instance, the memory system may determine whether the memory system has reached the end of boot-up. If the memory system has not reached the end of boot-up (e.g., the memory system is still to retrieve information associated with more LBAs) the memory system may proceed back to 420. However, if the memory system has reached the end of boot-up, the memory system may proceed to 455.

At 425, the LBA whose information was not retrievable from the volatile memory device at 420 may be recorded. For instance, the memory system may record the LBA whose information was not retrievable from the volatile memory device at 420 and may proceed to 430. At 430, a miss counter may be incremented by 1 to indicate how many LBAs information have failed to have been retrieved from the volatile memory device. For instance, the memory system may increment a miss counter by 1 to indicate how many LBAs the memory system has failed to retrieve corresponding information from the volatile memory device for. At 435, whether the miss counter is at or above a threshold quantity may be determined. the memory system may determine whether the miss counter satisfies a threshold quantity. If the miss counter is below the threshold quantity, the memory system may proceed back to 420. However, if the miss counter is at or above the threshold quantity, the memory system may proceed to 445.

At 445, boot replay may be exited. For instance, the memory system may exit boot replay and may proceed to 450. At 450, any remaining LBAs that are to be accessed during boot-up may be recorded. For instance, the memory system may record any remaining LBAs that the memory system is to access during boot-up and may proceed to 455. At 455, the memory system may end boot-up.

Figure 5:
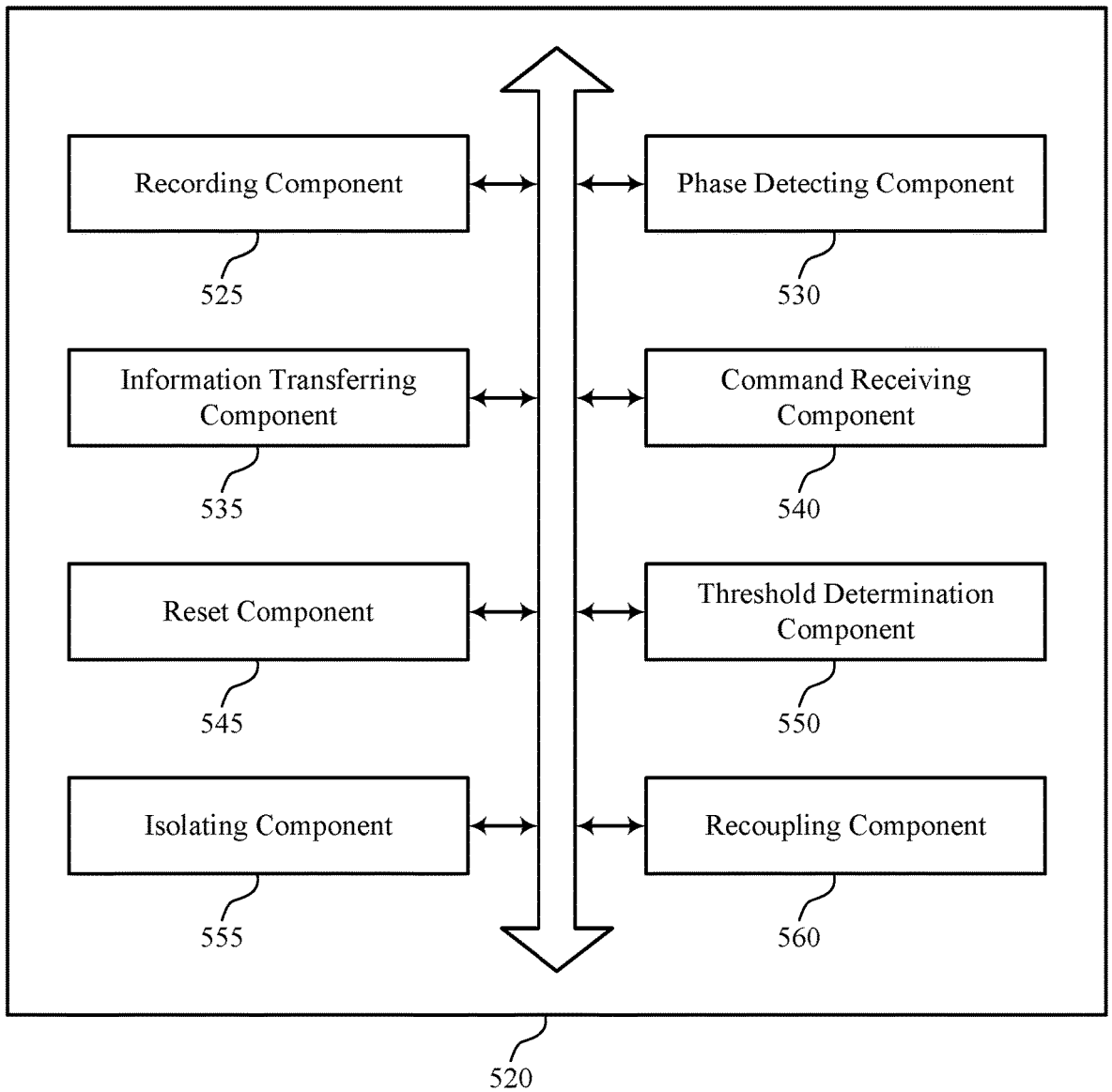
FIG. 5 shows a block diagram of a memory system that supports automotive boot optimization in accordance with examples as disclosed herein.

FIG. 5 shows a block diagram 500 of a memory system 520 that supports automotive boot optimization in accordance with examples as disclosed herein. The memory system 520 may be an example of aspects of a memory system as described with reference to FIGS. 1 through 4. The memory system 520, or various components thereof, may be an example of means for performing various aspects of automotive boot optimization as described herein. For example, the memory system 520 may include a recording component 525, a phase detecting component 530, an information transferring component 535, a command receiving component 540, a reset component 545, a threshold determination component 550, an isolating component 555, a recoupling component 560, or any combination thereof. Each of these components may communicate, directly or indirectly, with one another (e.g., via one or more buses).

The recording component 525 may be configured as or otherwise support a means for recording a first phase of a first boot-up procedure and a second phase of the first boot-up procedure. The phase detecting component 530 may be configured as or otherwise support a means for detecting that the first phase of a second boot-up procedure is occurring, where the second boot-up procedure occurs after the first boot-up procedure. The information transferring component 535 may be configured as or otherwise support a means for transferring, from a first logical block address of a non-volatile memory device to a volatile memory device, first information for the first phase of the second boot-up procedure based at least in part on the recording of the first phase of the first boot-up procedure and in response to detecting that the first phase of the second boot-up procedure is occurring. The command receiving component 540 may be configured as or otherwise support a means for receiving a first command to transmit the first information to a host system as part of the first phase of the second boot-up procedure after transferring the first information from the non-volatile memory device to the volatile memory device. In some examples, the phase detecting component 530 may be configured as or otherwise support a means for detecting that the second phase of the second boot-up procedure is occurring. In some examples, the information transferring component 535 may be configured as or otherwise support a means for transferring, from a second logical block address of the non-volatile memory device to the volatile memory device, second information for the second phase of the second boot-up procedure based at least in part on the recording of the second phase of the first boot-up procedure and in response to detecting that the second phase of the second boot-up procedure is occurring. In some examples, the command receiving component 540 may be configured as or otherwise support a means for receiving a second command to transmit the second information to the host system as part of the second phase of the second boot-up procedure after transferring the second information from the non-volatile memory device to the volatile memory device.

In some examples, the recording component 525 may be configured as or otherwise support a means for recording a third phase of the first boot-up procedure. In some examples, the phase detecting component 530 may be configured as or otherwise support a means for detecting that the third phase of the second boot-up procedure is occurring. In some examples, the information transferring component 535 may be configured as or otherwise support a means for transferring, from a third logical block address of the non-volatile memory device to the volatile memory device, third information for the third phase of the second boot-up procedure based at least in part on the recording of the third phase of the first boot-up procedure and in response to detecting that the third phase of the second boot-up procedure is occurring. In some examples, the command receiving component 540 may be configured as or otherwise support a means for receiving a third command to transmit the third information to the host system as part of transferring the third information from the non-volatile memory device to the volatile memory device.

In some examples, the first phase includes a universal flash storage boot phase, the second phase includes kernel loading boot phase, and the third phase includes a kernel start boot phase.

In some examples, to support recording the first phase of the first boot-up procedure and the second phase of the first boot-up procedure, the recording component 525 may be configured as or otherwise support a means for recording the first phase of the first boot-up procedure. In some examples, to support recording the first phase of the first boot-up procedure and the second phase of the first boot-up procedure, the reset component 545 may be configured as or otherwise support a means for performing a reset on one or more components of the non-volatile memory device based at least in part on recording the first phase of the first boot-up procedure. In some examples, to support recording the first phase of the first boot-up procedure and the second phase of the first boot-up procedure, the recording component 525 may be configured as or otherwise support a means for recording the second phase of the first boot-up procedure based at least in part on performing the reset on the one or more components of the non-volatile memory device.

In some examples, to support performing the reset on the one or more components, the isolating component 555 may be configured as or otherwise support a means for isolating the one or more components of the non-volatile memory device from a voltage source. In some examples, to support performing the reset on the one or more components, the recoupling component 560 may be configured as or otherwise support a means for recoupling the one or more components of the non-volatile memory device with the voltage source.

In some examples, the reset component 545 may be configured as or otherwise support a means for performing a second reset on the one or more components of the non-volatile memory device before recording the first phase of the first boot-up procedure, where recording the first phase of the first boot-up procedure is based at least in part on performing the second reset.

In some examples, the reset component 545 may be configured as or otherwise support a means for performing a second reset on the one or more components of the non-volatile memory device based at least in part on recording the second phase of the first boot-up procedure. In some examples, the recording component 525 may be configured as or otherwise support a means for recording a third phase of the first boot-up procedure based at least in part on performing the second reset.

In some examples, the command receiving component 540 may be configured as or otherwise support a means for receiving one or more commands to transmit one or more instances of information to the host system. In some examples, the information transferring component 535 may be configured as or otherwise support a means for retrieving the one or more instances of information from the non-volatile memory device based at least in part on receiving the one or more commands, where the one or more instances of information are not transferred to the volatile memory device between detecting that the first phase of the second boot-up procedure is occurring and receiving the one or more commands. In some examples, the threshold determination component 550 may be configured as or otherwise support a means for determining that a quantity of the one or more instances of information is greater than a threshold quantity. In some examples, the recording component 525 may be configured as or otherwise support a means for rerecording the first phase or the second phase of the second boot-up procedure based at least in part on determining that the quantity of the one or more instances of information is greater than the threshold quantity.

In some examples, the command receiving component 540 may be configured as or otherwise support a means for receiving one or more commands to transmit one or more instances of information to the host system. In some examples, the information transferring component 535 may be configured as or otherwise support a means for retrieving the one or more instances of information from the non-volatile memory device based at least in part on receiving the one or more commands, where the one or more instances of information are not transferred to the volatile memory device between detecting that the first phase of the second boot-up procedure is occurring and receiving the one or more commands. In some examples, the threshold determination component 550 may be configured as or otherwise support a means for determining that a quantity of the one or more instances of information is less than a threshold quantity. In some examples, the recording component 525 may be configured as or otherwise support a means for transferring third information stored at a third logical block address of the non-volatile memory device into the volatile memory device for the first phase or the second phase of the second boot-up procedure based at last in part on determining that the quantity of the one or more instances of information is less than the threshold quantity.

In some examples, the non-volatile memory device includes a NAND memory device and the volatile memory device includes a DRAM memory device.

Figure 6:
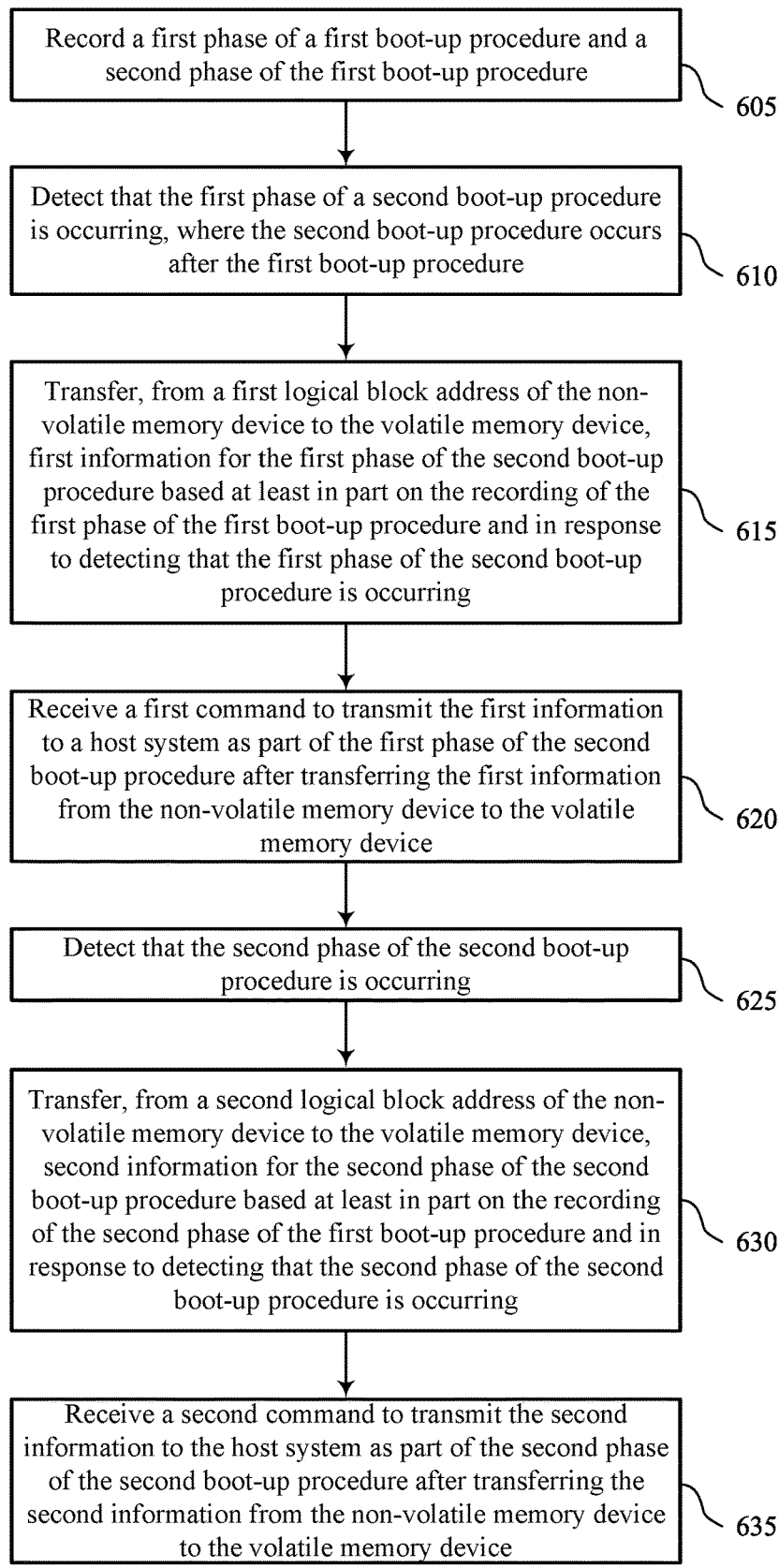
FIG. 6 shows a flowchart illustrating a method or methods that support automotive boot optimization in accordance with examples as disclosed herein.

FIG. 6 shows a flowchart illustrating a method 600 that supports automotive boot optimization in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, the method may include recording a first phase of a first boot-up procedure and a second phase of the first boot-up procedure. The operations of 605 may be performed in accordance with examples as disclosed herein. In some examples, aspects of the operations of 605 may be performed by a recording component 525 as described with reference to FIG. 5.

At 610, the method may include detecting that the first phase of a second boot-up procedure is occurring, where the second boot-up procedure occurs after the first boot-up procedure. The operations of 610 may be performed in accordance with examples as disclosed herein. In some examples, aspects of the operations of 610 may be performed by a phase detecting component 530 as described with reference to FIG. 5.

At 615, the method may include transferring, from a first logical block address of the non-volatile memory device to the volatile memory device, first information for the first phase of the second boot-up procedure based at least in part on the recording of the first phase of the first boot-up procedure and in response to detecting that the first phase of the second boot-up procedure is occurring. The operations of 615 may be performed in accordance with examples as disclosed herein. In some examples, aspects of the operations of 615 may be performed by an information transferring component 535 as described with reference to FIG. 5.

At 620, the method may include receiving a first command to transmit the first information to a host system as part of the first phase of the second boot-up procedure after transferring the first information from the non-volatile memory device to the volatile memory device. The operations of 620 may be performed in accordance with examples as disclosed herein. In some examples, aspects of the operations of 620 may be performed by a command receiving component 540 as described with reference to FIG. 5.

At 625, the method may include detecting that the second phase of the second boot-up procedure is occurring. The operations of 625 may be performed in accordance with examples as disclosed herein. In some examples, aspects of the operations of 625 may be performed by a phase detecting component 530 as described with reference to FIG. 5.

At 630, the method may include transferring, from a second logical block address of the non-volatile memory device to the volatile memory device, second information for the second phase of the second boot-up procedure based at least in part on the recording of the second phase of the first boot-up procedure and in response to detecting that the second phase of the second boot-up procedure is occurring. The operations of 630 may be performed in accordance with examples as disclosed herein. In some examples, aspects of the operations of 630 may be performed by an information transferring component 535 as described with reference to FIG. 5.

At 635, the method may include receiving a second command to transmit the second information to the host system as part of the second phase of the second boot-up procedure after transferring the second information from the non-volatile memory device to the volatile memory device. The operations of 635 may be performed in accordance with examples as disclosed herein. In some examples, aspects of the operations of 635 may be performed by a command receiving component 540 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for recording a first phase of a first boot-up procedure and a second phase of the first boot-up procedure, detecting that the first phase of a second boot-up procedure is occurring, where the second boot-up procedure occurs after the first boot-up procedure, transferring, from a first logical block address of a non-volatile memory device to a volatile memory device, first information for the first phase of the second boot-up procedure based at least in part on the recording of the first phase of the first boot-up procedure and in response to detecting that the first phase of the second boot-up procedure is occurring, receiving a first command to transmit the first information to a host system as part of the first phase of the second boot-up procedure after transferring the first information from the non-volatile memory device to the volatile memory device, detecting that the second phase of the second boot-up procedure is occurring, transferring, from a second logical block address of the non-volatile memory device to the volatile memory device, second information for the second phase of the second boot-up procedure based at least in part on the recording of the second phase of the first boot-up procedure and in response to detecting that the second phase of the second boot-up procedure is occurring, and receiving a second command to transmit the second information to the host system as part of the second phase of the second boot-up procedure after transferring the second information from the non-volatile memory device to the volatile memory device.

Some examples of the method 600 and the apparatus described herein may further include operations, features, circuitry, logic, means, or instructions for recording a third phase of the first boot-up procedure, detecting that the third phase of the second boot-up procedure may be occurring, transferring, from a third logical block address of the non-volatile memory device to the volatile memory device, third information for the third phase of the second boot-up procedure based at least in part on the recording of the third phase of the first boot-up procedure and in response to detecting that the third phase of the second boot-up procedure may be occurring, and receiving a third command to transmit the third information to the host system as part of transferring the third information from the non-volatile memory device to the volatile memory device.

In some examples of the method 600 and the apparatus described herein, the first phase includes a universal flash storage boot phase, the second phase includes kernel loading boot phase, and the third phase includes a kernel start boot phase.

In some examples of the method 600 and the apparatus described herein, recording the first phase of the first boot-up procedure and the second phase of the first boot-up procedure may include operations, features, circuitry, logic, means, or instructions for recording the first phase of the first boot-up procedure, performing a reset on one or more components of the non-volatile memory device based at least in part on recording the first phase of the first boot-up procedure, and recording the second phase of the first boot-up procedure based at least in part on performing the reset on the one or more components of the non-volatile memory device.

In some examples of the method 600 and the apparatus described herein, performing the reset on the one or more components may include operations, features, circuitry, logic, means, or instructions for isolating the one or more components of the non-volatile memory device from a voltage source and recoupling the one or more components of the non-volatile memory device with the voltage source.

Some examples of the method 600 and the apparatus described herein may further include operations, features, circuitry, logic, means, or instructions for performing a second reset on the one or more components of the non-volatile memory device before recording the first phase of the first boot-up procedure, where recording the first phase of the first boot-up procedure may be based at least in part on performing the second reset.

Some examples of the method 600 and the apparatus described herein may further include operations, features, circuitry, logic, means, or instructions for performing a second reset on the one or more components of the non-volatile memory device based at least in part on recording the second phase of the first boot-up procedure and recording a third phase of the first boot-up procedure based at least in part on performing the second reset.

Some examples of the method 600 and the apparatus described herein may further include operations, features, circuitry, logic, means, or instructions for receiving one or more commands to transmit one or more instances of information to the host system, retrieving the one or more instances of information from the non-volatile memory device based at least in part on receiving the one or more commands, where the one or more instances of information may be not transferred to the volatile memory device between detecting that the first phase of the second boot-up procedure may be occurring and receiving the one or more commands, determining that a quantity of the one or more instances of information may be greater than a threshold quantity, and rerecording the first phase or the second phase of the second boot-up procedure based at least in part on determining that the quantity of the one or more instances of information may be greater than the threshold quantity.

Some examples of the method 600 and the apparatus described herein may further include operations, features, circuitry, logic, means, or instructions for receiving one or more commands to transmit one or more instances of information to the host system, retrieving the one or more instances of information from the non-volatile memory device based at least in part on receiving the one or more commands, where the one or more instances of information may be not transferred to the volatile memory device between detecting that the first phase of the second boot-up procedure may be occurring and receiving the one or more commands, determining that a quantity of the one or more instances of information may be less than a threshold quantity, and transferring third information stored at a third logical block address of the non-volatile memory device into the volatile memory device for the first phase or the second phase of the second boot-up procedure based at last in part on determining that the quantity of the one or more instances of information may be less than the threshold quantity.

In some examples of the method 600 and the apparatus described herein, the non-volatile memory device includes a NAND memory device and the volatile memory device includes a DRAM memory device.

It should be noted that the methods described above describe possible implementations, and that the operations and the steps may be rearranged or otherwise modified and that other implementations are possible. Further, portions from two or more of the methods may be combined.

An apparatus is described. The apparatus may include a non-volatile memory device, a volatile memory device, a controller coupled with the non-volatile memory device and the volatile memory device, where the controller is configured to cause the apparatus to record a first phase of a first boot-up procedure and a second phase of the first boot-up procedure, detect that the first phase of a second boot-up procedure is occurring, where the second boot-up procedure occurs after the first boot-up procedure, transfer, from a first logical block address of the non-volatile memory device to the volatile memory device, first information for the first phase of the second boot-up procedure based at least in part on the recording of the first phase of the first boot-up procedure and in response to detecting that the first phase of the second boot-up procedure is occurring, receive a first command to transmit the first information to a host system as part of the first phase of the second boot-up procedure after transferring the first information from the non-volatile memory device to the volatile memory device, detect that the second phase of the second boot-up procedure is occurring, transfer, from a second logical block address of the non-volatile memory device to the volatile memory device, second information for the second phase of the second boot-up procedure based at least in part on the recording of the second phase of the first boot-up procedure and in response to detecting that the second phase of the second boot-up procedure is occurring, and receive a second command to transmit the second information to the host system as part of the second phase of the second boot-up procedure after transferring the second information from the non-volatile memory device to the volatile memory device.

In some examples, the apparatus may include record a third phase of the first boot-up procedure, detect that the third phase of the second boot-up procedure may be occurring, transfer, from a third logical block address of the non-volatile memory device to the volatile memory device, third information for the third phase of the second boot-up procedure based at least in part on the recording of the third phase of the first boot-up procedure and in response to detecting that the third phase of the second boot-up procedure may be occurring, and receive a third command to transmit the third information to the host system as part of transferring the third information from the non-volatile memory device to the volatile memory device.

In some examples of the apparatus, the first phase includes a universal flash storage boot phase, the second phase includes kernel loading boot phase, and the third phase includes a kernel start boot phase.

In some examples, the apparatus may include record the first phase of the first boot-up procedure, perform a reset on one or more components of the non-volatile memory device based at least in part on recording the first phase of the first boot-up procedure, and record the second phase of the first boot-up procedure based at least in part on performing the reset on the one or more components of the non-volatile memory device.

In some examples, the apparatus may include isolate the one or more components of the non-volatile memory device from a voltage source and recouple the one or more components of the non-volatile memory device with the voltage source.

In some examples, the apparatus may include perform a second reset on the one or more components of the non-volatile memory device before recording the first phase of the first boot-up procedure, where recording the first phase of the first boot-up procedure may be based at least in part on performing the second reset.

In some examples, the apparatus may include perform a second reset on the one or more components of the non-volatile memory device based at least in part on recording the second phase of the first boot-up procedure and record a third phase of the first boot-up procedure based at least in part on performing the second reset.

In some examples, the apparatus may include receive one or more commands to transmit one or more instances of information to the host system, retrieve the one or more instances of information from the non-volatile memory device based at least in part on receiving the one or more commands, where the one or more instances of information may be not transferred to the volatile memory device between detecting that the first phase of the second boot-up procedure may be occurring and receiving the one or more commands, determine that a quantity of the one or more instances of information may be greater than a threshold quantity, and rerecord the first phase or the second phase of the second boot-up procedure based at least in part on determining that the quantity of the one or more instances of information may be greater than the threshold quantity.

In some examples, the apparatus may include receive one or more commands to transmit one or more instances of information to the host system, retrieve the one or more instances of information from the non-volatile memory device based at least in part on receiving the one or more commands, where the one or more instances of information may be not transferred to the volatile memory device between detecting that the first phase of the second boot-up procedure may be occurring and receiving the one or more commands, determine that a quantity of the one or more instances of information may be less than a threshold quantity, and transfer third information stored at a third logical block address of the non-volatile memory device into the volatile memory device for the first phase or the second phase of the second boot-up procedure based at last in part on determining that the quantity of the one or more instances of information may be less than the threshold quantity.

In some examples of the apparatus, the non-volatile memory device includes a NAND memory device and the volatile memory device includes a DRAM memory device.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a non-volatile memory device;
   a volatile memory device; and
   a controller coupled with the non-volatile memory device and the volatile memory device and configured to cause the apparatus to:
   record a first phase of a first boot-up procedure and a second phase of the first boot-up procedure;
   detect that the first phase of a second boot-up procedure is occurring, wherein the second boot-up procedure occurs after the first boot-up procedure;
   transfer, from a first logical block address of the non-volatile memory device to the volatile memory device, first information for the first phase of the second boot-up procedure based at least in part on the recording of the first phase of the first boot-up procedure and in response to detecting that the first phase of the second boot-up procedure is occurring;
   receive a first command to transmit the first information to a host system as part of the first phase of the second boot-up procedure after transferring the first information from the non-volatile memory device to the volatile memory device;
   detect that the second phase of the second boot-up procedure is occurring;
   transfer, from a second logical block address of the non-volatile memory device to the volatile memory device, second information for the second phase of the second boot-up procedure based at least in part on the recording of the second phase of the first boot-up procedure and in response to detecting that the second phase of the second boot-up procedure is occurring; and
   receive a second command to transmit the second information to the host system as part of the second phase of the second boot-up procedure after transferring the second information from the non-volatile memory device to the volatile memory device.

2. The apparatus of claim 1, wherein the controller is configured to cause the apparatus to:
   record a third phase of the first boot-up procedure;
   detect that the third phase of the second boot-up procedure is occurring;
   transfer, from a third logical block address of the non-volatile memory device to the volatile memory device, third information for the third phase of the second boot-up procedure based at least in part on the recording of the third phase of the first boot-up procedure and in response to detecting that the third phase of the second boot-up procedure is occurring; and
   receive a third command to transmit the third information to the host system as part of transferring the third information from the non-volatile memory device to the volatile memory device.

3. The apparatus of claim 2, wherein the first phase comprises a universal flash storage boot phase, the second phase comprises kernel loading boot phase, and the third phase comprises a kernel start boot phase.

4. The apparatus of claim 1, wherein the controller being configured to cause the apparatus to record the first phase of the first boot-up procedure and the second phase of the first boot-up procedure comprises the controller being configured to cause the apparatus to:
   record the first phase of the first boot-up procedure;
   perform a reset on one or more components of the non-volatile memory device based at least in part on recording the first phase of the first boot-up procedure; and
   record the second phase of the first boot-up procedure based at least in part on performing the reset on the one or more components of the non-volatile memory device.

5. The apparatus of claim 4, wherein the controller being configured to perform the reset on the one or more components comprises the controller being configured to cause the apparatus to:
   isolate the one or more components of the non-volatile memory device from a voltage source; and
   recouple the one or more components of the non-volatile memory device with the voltage source.

6. The apparatus of claim 4, wherein the controller is further configured to:
   perform a second reset on the one or more components of the non-volatile memory device before recording the first phase of the first boot-up procedure, wherein recording the first phase of the first boot-up procedure is based at least in part on performing the second reset.

7. The apparatus of claim 4, wherein the controller is further configured to:
   perform a second reset on the one or more components of the non-volatile memory device based at least in part on recording the second phase of the first boot-up procedure; and
   record a third phase of the first boot-up procedure based at least in part on performing the second reset.

8. The apparatus of claim 1, wherein the controller is further configured to:
   receive one or more commands to transmit one or more instances of information to the host system;
   retrieve the one or more instances of information from the non-volatile memory device based at least in part on receiving the one or more commands, wherein the one or more instances of information are not transferred to the volatile memory device between detecting that the first phase of the second boot-up procedure is occurring and receiving the one or more commands;

determine that a quantity of the one or more instances of information is greater than a threshold quantity; and rerecord the first phase or the second phase of the second boot-up procedure based at least in part on determining that the quantity of the one or more instances of information is greater than the threshold quantity.

9. The apparatus of claim 1, wherein the controller is further configured to:

receive one or more commands to transmit one or more instances of information to the host system;

retrieve the one or more instances of information from the non-volatile memory device based at least in part on receiving the one or more commands, wherein the one or more instances of information are not transferred to the volatile memory device between detecting that the first phase of the second boot-up procedure is occurring and receiving the one or more commands;

determine that a quantity of the one or more instances of information is less than a threshold quantity; and transfer third information stored at a third logical block address of the non-volatile memory device into the volatile memory device for the first phase or the second phase of the second boot-up procedure based at last in part on determining that the quantity of the one or more instances of information is less than the threshold quantity.

10. The apparatus of claim 1, wherein the non-volatile memory device comprises a not-AND (NAND) memory device and the volatile memory device comprises a dynamic random access memory (DRAM) memory device.

11. A non-transitory computer-readable medium comprising instructions which, when executed by a processor of an electronic device, cause the electronic device to:

record a first phase of a first boot-up procedure and a second phase of the first boot-up procedure;

detect that the first phase of a second boot-up procedure is occurring, wherein the second boot-up procedure occurs after the first boot-up procedure;

transfer, from a first logical block address of a non-volatile memory device to a volatile memory device, first information for the first phase of the second boot-up procedure based at least in part on the recording of the first phase of the first boot-up procedure and in response to detecting that the first phase of the second boot-up procedure is occurring;

receive a first command to transmit the first information to a host system as part of the first phase of the second boot-up procedure after transferring the first information from the non-volatile memory device to the volatile memory device;

detect that the second phase of the second boot-up procedure is occurring;

transfer, from a second logical block address of the non-volatile memory device to the volatile memory device, second information for the second phase of the second boot-up procedure based at least in part on the recording of the second phase of the first boot-up procedure and in response to detecting that the second phase of the second boot-up procedure is occurring; and receive a second command to transmit the second information to the host system as part of the second phase of the second boot-up procedure after transferring the second information from the non-volatile memory device to the volatile memory device.

12. The non-transitory computer-readable medium of claim 11, wherein the instructions, when executed by the processor of the electronic device, further cause the electronic device to:

record a third phase of the first boot-up procedure;

detect that the third phase of the second boot-up procedure is occurring;

transfer, from a third logical block address of the non-volatile memory device to the volatile memory device, third information for the third phase of the second boot-up procedure based at least in part on the recording of the third phase of the first boot-up procedure and in response to detecting that the third phase of the second boot-up procedure is occurring; and receive a third command to transmit the third information to the host system as part of transferring the third information from the non-volatile memory device to the volatile memory device.

13. The non-transitory computer-readable medium of claim 12, wherein the first phase comprises a universal flash storage boot phase, the second phase comprises kernel loading boot phase, and the third phase comprises a kernel start boot phase.

14. The non-transitory computer-readable medium of claim 11, wherein the instructions causing the electronic device to record the first phase of the first boot-up procedure and the second phase of the first boot-up procedure cause the electronic device, when executed by the processor of the electronic device, to:

record the first phase of the first boot-up procedure;

perform a reset on one or more components of the non-volatile memory device based at least in part on recording the first phase of the first boot-up procedure; and record the second phase of the first boot-up procedure based at least in part on performing the reset on the one or more components of the non-volatile memory device.

15. The non-transitory computer-readable medium of claim 14, wherein the instructions causing the electronic device to perform the reset on the one or more components cause the electronic device, when executed by the processor of the electronic device to:

isolate the one or more components of the non-volatile memory device from a voltage source; and recouple the one or more components of the non-volatile memory device with the voltage source.

16. The non-transitory computer-readable medium of claim 14, wherein the instructions, when executed by the processor of the electronic device, further cause the electronic device to:

perform a second reset on the one or more components of the non-volatile memory device before recording the first phase of the first boot-up procedure, wherein recording the first phase of the first boot-up procedure is based at least in part on performing the second reset.

17. The non-transitory computer-readable medium of claim 14, wherein the instructions, when executed by the processor of the electronic device, further cause the electronic device to:

perform a second reset on the one or more components of the non-volatile memory device based at least in part on recording the second phase of the first boot-up procedure; and record a third phase of the first boot-up procedure based at least in part on performing the second reset.

18. The non-transitory computer-readable medium of claim 11, wherein the instructions, when executed by the processor of the electronic device, further cause the electronic device to:
receive one or more commands to transmit one or more instances of information to the host system;
retrieve the one or more instances of information from the non-volatile memory device based at least in part on receiving the one or more commands, wherein the one or more instances of information are not transferred to the volatile memory device between detecting that the first phase of the second boot-up procedure is occurring and receiving the one or more commands;
determine that a quantity of the one or more instances of information is greater than a threshold quantity; and
rerecord the first phase or the second phase of the second boot-up procedure based at least in part on determining that the quantity of the one or more instances of information is greater than the threshold quantity.

19. The non-transitory computer-readable medium of claim 11, wherein the instructions, when executed by the processor of the electronic device, further cause the electronic device to:
receive one or more commands to transmit one or more instances of information to the host system;
retrieve the one or more instances of information from the non-volatile memory device based at least in part on receiving the one or more commands, wherein the one or more instances of information are not transferred to the volatile memory device between detecting that the first phase of the second boot-up procedure is occurring and receiving the one or more commands;
determine that a quantity of the one or more instances of information is less than a threshold quantity; and
transfer third information stored at a third logical block address of the non-volatile memory device into the volatile memory device for the first phase or the second phase of the second boot-up procedure based at last in part on determining that the quantity of the one or more instances of information is less than the threshold quantity.

20. The non-transitory computer-readable medium of claim 11, wherein the non-volatile memory device comprises a not-AND (NAND) memory device and the volatile memory device comprises a dynamic random access memory (DRAM) memory device.

21. A method, comprising:
recording a first phase of a first boot-up procedure and a second phase of the first boot-up procedure;
detecting that the first phase of a second boot-up procedure is occurring, wherein the second boot-up procedure occurs after the first boot-up procedure;
transferring, from a first logical block address of a non-volatile memory device to a volatile memory device, first information for the first phase of the second boot-up procedure based at least in part on the recording of the first phase of the first boot-up procedure and in response to detecting that the first phase of the second boot-up procedure is occurring;
receiving a first command to transmit the first information to a host system as part of the first phase of the second boot-up procedure after transferring the first information from the non-volatile memory device to the volatile memory device;
detecting that the second phase of the second boot-up procedure is occurring;
transferring, from a second logical block address of the non-volatile memory device to the volatile memory device, second information for the second phase of the second boot-up procedure based at least in part on the recording of the second phase of the first boot-up procedure and in response to detecting that the second phase of the second boot-up procedure is occurring; and
receiving a second command to transmit the second information to the host system as part of the second phase of the second boot-up procedure after transferring the second information from the non-volatile memory device to the volatile memory device.

22. The method of claim 21, further comprising:
recording a third phase of the first boot-up procedure;
detecting that the third phase of the second boot-up procedure is occurring;
transferring, from a third logical block address of the non-volatile memory device to the volatile memory device, third information for the third phase of the second boot-up procedure based at least in part on the recording of the third phase of the first boot-up procedure and in response to detecting that the third phase of the second boot-up procedure is occurring; and
receiving a third command to transmit the third information to the host system as part of transferring the third information from the non-volatile memory device to the volatile memory device.

23. The method of claim 22, wherein the first phase comprises a universal flash storage boot phase, the second phase comprises kernel loading boot phase, and the third phase comprises a kernel start boot phase.

24. The method of claim 21, wherein recording the first phase of the first boot-up procedure and the second phase of the first boot-up procedure comprises:
recording the first phase of the first boot-up procedure;
performing a reset on one or more components of the non-volatile memory device based at least in part on recording the first phase of the first boot-up procedure; and
recording the second phase of the first boot-up procedure based at least in part on performing the reset on the one or more components of the non-volatile memory device.

25. The method of claim 24, wherein performing the reset on the one or more components comprises:
isolating the one or more components of the non-volatile memory device from a voltage source; and
recoupling the one or more components of the non-volatile memory device with the voltage source.

* * * * *